United States Patent [19]

Reeves

[11] Patent Number: 4,571,488
[45] Date of Patent: Feb. 18, 1986

[54] HEAT-FUSION PIPE FITTING SYSTEM

[75] Inventor: Anthony V. Reeves, Nottingham, England

[73] Assignee: E. I. Du Pont de Nemours and Company, Wilmington, Del.

[21] Appl. No.: 696,198

[22] Filed: Jan. 29, 1985

[51] Int. Cl.⁴ .............................................. H05B 3/58
[52] U.S. Cl. .................................. 219/544; 156/380.1; 219/535; 219/541; 219/492; 219/494; 264/272.11; 285/21; 285/292
[58] Field of Search ............... 219/482, 494, 528, 535, 219/541, 544, 549, 552; 156/379.6, 380.1; 285/21, 22, 292; 264/272.11

[56] References Cited

U.S. PATENT DOCUMENTS

| | | | |
|---|---|---|---|
| 3,422,179 | 1/1969 | Bauer et al. | 264/272.11 |
| 3,465,126 | 9/1969 | Blumenkranz | 219/482 |
| 3,789,192 | 1/1974 | Spindler | 219/522 |
| 4,117,311 | 9/1978 | Sturm | 219/544 |
| 4,253,011 | 2/1981 | Hinz | 219/544 X |
| 4,486,650 | 12/1984 | Bridgstock et al. | 219/544 |

Primary Examiner—Volodymyr Y. Mayewsky

[57] ABSTRACT

A thermoplastic heat-fusion pipe fitting system comprising a thermoplastic heat-fusion pipe fitting having a body portion to accommodate pipe and a shaped portion bearing a code indicative of the amount of heat required to effect fusion of the fitting, means for heating the fitting, means for sensing and decoding the code, and control means responsive to information decoded from the code for regulating the amount of heat applied by the heating means to the fitting.

28 Claims, 6 Drawing Figures

HEAT-FUSION PIPE FITTING SYSTEM

BACKGROUND OF THE INVENTION

This invention relates to a thermoplastic heat-fusion pipe fitting system and a method of electro-welding thermoplastic pipe using such a system. Thermoplastic heat-fusion pipe fittings have long been used to join thermoplastic pipe members. There are many designs for such fittings, which tend to fall into three basic types: (1) those having an electrical heating element which is embedded within the body of the fitting and located in close proximity to the surface of the fitting that is to be joined to the pipe member by heat-fusion for an example, as disclosed by Bauer et al. in U.S. Pat. No. 3,432,179; (2) a metal core embedded in the body of the fitting in which eddy currents can be induced by the action of an induction coil thereby producing a heating effect in the core; and (3) those which are meant to be heated by the application of an external heat source.

Each design of heat-fusion pipe fitting requires a special amount of heat to be delivered to it to effect fusion of the fitting to a pipe member. For example, each variation in the design of an electrical heating element used in a type (1) heat-fusion pipe fitting changes its electrical characteristics, and thus the amount of power developed in the heating element to produce sufficient heat to effect fusion. Since most of these pipe fittings are installed in a trench, this variation in heat requirements can cause problems in field installation and often necessitates using labor having a greater degree of skill than is normally required for installing thermoplastic pipe lines and pipe line replacement sections.

In order to simplify installation of type (1) pipe fittings, Blumenkranz in U.S. Pat. No. 3,465,126 discloses a power unit for use in thermal welding of thermoplastic pipe sections. This power unit would be used to supply the energy to the electrical heating element under controlled conditions as to voltage and duration of power application. Predetermined levels of output voltage and power application are set prior to the use of the power unit in the field. However, this type of procedure does not make allowances for field use of different types of fittings on the same job site.

Published European Patent Application No. 76 043 discloses a type (1) electrofusion pipe fitting having incorporated therein an identity resistor. This resistor would have a value dependent on the energy to be dissipated by the electrical heating element within the fitting. This fitting would be used in conjunction with control apparatus that would sense the characteristics of the identity resistor and use this information to automatically control the power applied to the electrofusion fitting. However, the fitting employed in this system is more difficult to manufacture than one having an electrical heating element alone, because of the addition of the identity resistor and its associated wiring and terminals.

SUMMARY OF THE INVENTION

According to this invention, there is provided, in a thermoplastic heat-fusion pipe fitting and its associated power supply, an improved means for controlling the input power to the fitting.

Specifically, the present invention provides a thermoplastic heat-fusion pipe fitting system comprising a thermoplastic heat-fusion pipe fitting having a body portion to accomodate pipe and a shaped portion having formed thereon a code indicative of the amount of heat required to effect fusion of the fitting, means for heating the fitting associated with the fitting, means for sensing and decoding the code, and control means responsive to information decoded from the code for regulating the amount of heat applied by the heating means to the fitting.

The present invention also provides, in a thermoplastic heat-fusion pipe fitting and control system, the pipe fitting having a body portion adapted to accommodate pipe at both ends and having an electrical heating element embedded therein and heating element terminals exposed to the exterior of the body portion and having an electrical control system to supply power to the terminals, the improvement comprising:

a coding tab mounted on the body portion, the coding tab having passages for light formed therein and arranged in a pattern indicative of the fusion time required for the heating element, means for passing light signals through the passages in the coding tab to form electrical signals indicative of the pattern of the passages, and a control circuit, operatively connected with the means for passing light signals, for converting the electrical signals to control signals which regulate the quantity of power applied to the terminals as a function of the electrical signals.

The invention further provides a method of electrically welding thermoplastic pipe which comprises
(a) providing a thermoplastic heat-fusion pipe fitting having a body portion to accomodate pipe and a shaped portion bearing a code indicative of the amount of heat required to effect fusion of the fitting;
(b) bringing the pipe and the pipe fitting into proximity with each other;
(c) sensing and decoding the code; and
(d) applying heat to the fitting in accordance with information decoded from the code.

DESCRIPTION OF THE INVENTION

Figure 1:
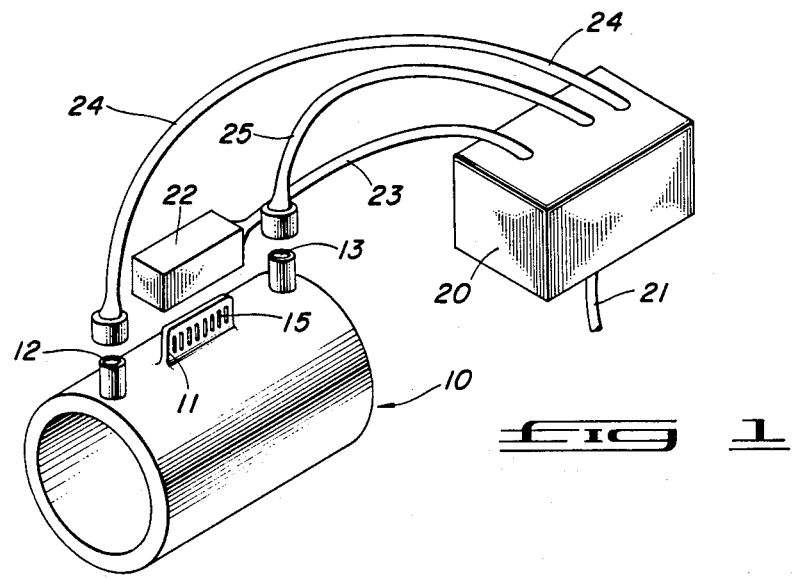
FIG. 1. is a schematic view of a heat-fusion pipe fitting and control system of the present invention.

The present invention provides an apparatus and system for forming fusion welds in thermoplastic pipes so that they can be used in pressurized applications such as in water and gas distribution systems. The heating means can be an electrical heating element integral with the fitting, an induction coil and a metal core integral with the fitting, or a non-integral heating member, such as a heated plate, for application to a surface of the fitting.

The shaped portion bearing a code is preferably integrally molded with the body portion of the fitting, and, most preferably, bears a digital code. This shaped portion can lie flush to the surface of the fitting or, preferably, constitutes a tab standing out from the fitting. It has been found to be particularly convenient to provide this shaped, code-bearing portion in the form of a tab mounted directly onto the pipe fittings. This coding tab has no electrical association with the heating element of the fitting but is used in the control system of an associated power supply apparatus for controlling the duration of the voltage applied to the terminals of the fitting. The coding tab contains holes or slots arranged in a predetermined sequence for use with a light detecting control system. The holes or slots are arranged to pass or stop infra-red light in optically-coupled paths in a prearranged sequence which generates an electrical signal that is indicative of the characteristics of the heating element of the fitting. This signal is converted, in a control circuit, to a control signal which regulates the duration of the voltage applied to the power terminals of the fitting. As an alternative to apertures or slots in the coding area, a wide variety of means can be used to indicate the code, such as a row of stippling either on the surface of the fitting or on a tab projecting from the fitting, or by means of a tab having areas of reduced thickness instead of apertures or slots.

The control means can control the amount of heat supplied to the fitting either by regulating the time for which the heating means is activated by regulating the electrical power supply to the heating means by controlling the voltage or current applied to the heating means.

The sensing means can take a wide variety of forms depending on the physical form in which the code is expressed. For example, if the code is expressed as an array of apertures in a projecting tab, the sensing means can comprise at least one signal generating means for translating signals through the apertures and the corresponding number of signal detecting means located so as to detect the signals passing through the apertures. The signal generating means can be, for example, a source of electrical magnetic radiation, particularly a source of infrared or white light, a sound generator, a gas emitter and the like, with signal detecting means responsive to the type of signal generated.

It is also preferred that the shaped portion be releasably connectable to the sensing and decoding means. For instance, the sensing means can be located in a head which is designed to fit over the shaped portion when the shaped portion is a projecting tab.

A typical apparatus of the present invention is more fully illustrated in the drawings. FIG. 1 shows a typical system which comprises heat-fusion pipe fitting 10, coding tab 11, heating element terminals 12 and 13, power control unit 20, power supply 21, optical head 22, control circuit connecting means 23 and power leads 24 and 25. A wide variety of connecting means can be used. For example, with light emitting diodes and phototransistors located in the optical head, electrically conductive wire can be used. If the light source and sensors are remote from the optical head, optical fibers capable of transmitting the light can be used.

Figure 2:
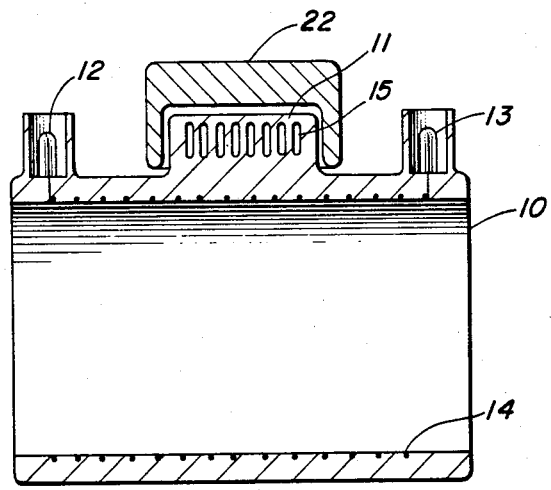
FIG. 2 is a cross-sectional view of the pipe fitting of FIG. 1.

FIG. 2 is a cross-sectional view of the heat-fusion pipe fitting 10 of FIG. 1. Heating element 14 consisting of electrical heating wire is in a spiral configuration and embedded within the thermoplastic body portion of the fitting 10. The heating element 14 is connected to the heating element terminals 12 and 13 which receive power from the power leads 24 and 25 shown in FIG. 1. Coding tab 11 has slots 15 which permit the passage of optical signals from within the optical head 22.

Figure 3:
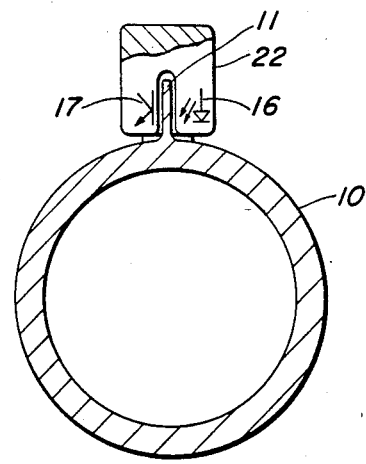
FIG. 3 is a cross-sectional view of the pipe fitting of FIG. 1, taken through the shaped portion bearing the code.

FIG. 3 is a cross-sectional view of pipe fitting 10 taken through the coding tab portion of the pipe fitting 10. The optical head 22 contains a series of uniformly spaced infra-red light emitting diodes 16 and photo-transistors 17 spaced in the same configuration as the diodes but on the opposite side of the coding tab 11. Light emitting diodes such as Texas TIL 24 and photo transistors such as Texas L5600 have been found to be readily adaptable for this type of application. The optical coupling path for the infra-red light is from the light emitting diodes 16, through slots 15 and to the photo-transistors 17. By the predetermined selection of the arrangement of slots 15, each transistor is held to an "on or off" state depending on the excitation if received from the light emitting diodes through the presence or absence of slots. In this manner, electrically coded signals are transmitted to the power control unit 20 through the return portion of control connecting means 23.

Figure 4:
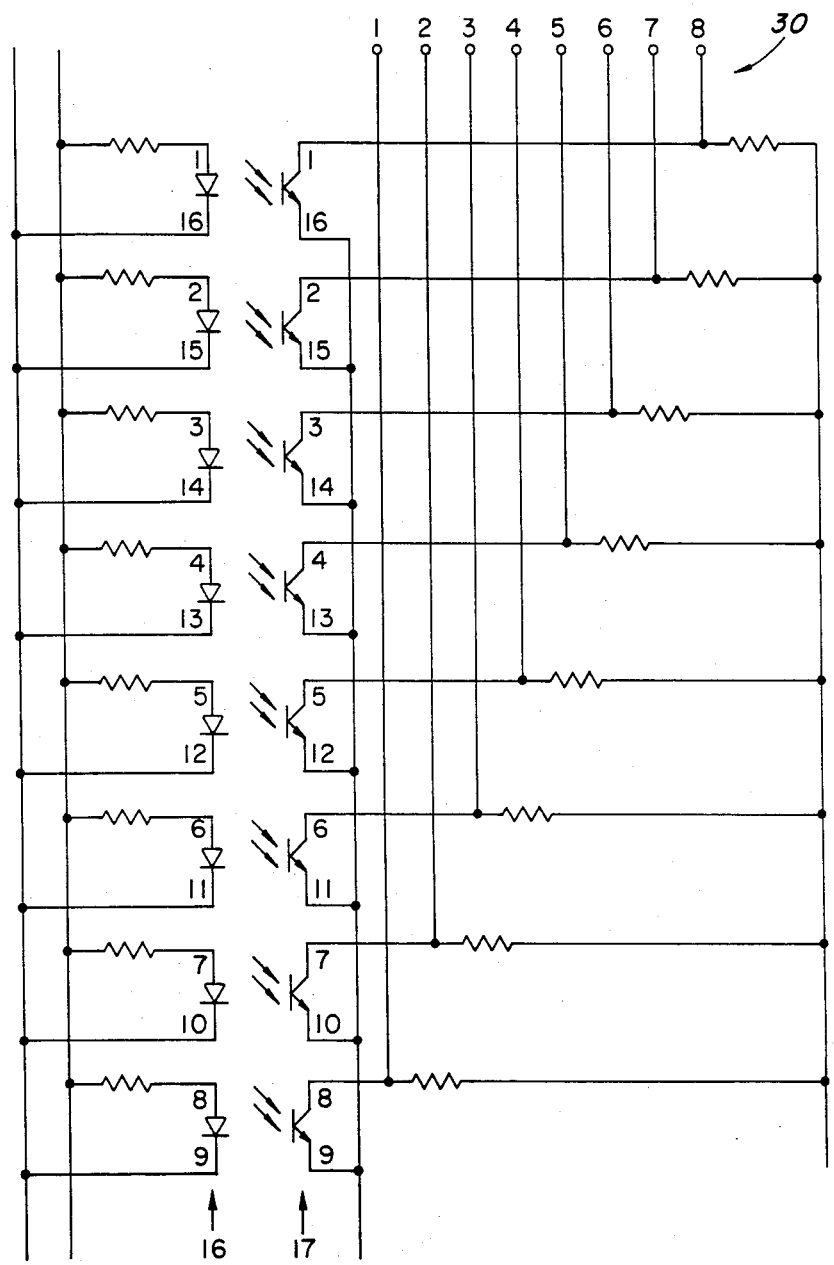
FIG. 4 is a schematic drawing of a photo/electric aperture sensing circuit which can be used with the pipe fitting of FIG. 1.

FIG. 4 is an electrical schematic diagram for the signal circuit showing the circuit positions of the light emitting diodes 16 and of the photo-transistors 17. The diodes are powered with 0–5 volts and are constantly in the transmit mode. These diodes thus emit light whenever the circuit is energized. Corresponding photo-transistors which are positioned as previously described receive excitation from the diodes if there is a slot in the coding tab between the diode and the transistor.

The collector of these photo-transistors are in a high, 5 volt, state or a low, 0 volt, state depending on the optical path existing to the diode. An 8-bit digital code at circuit point 30 is transmitted to the control unit decoder input shown in FIG. 5.

Figure 5:
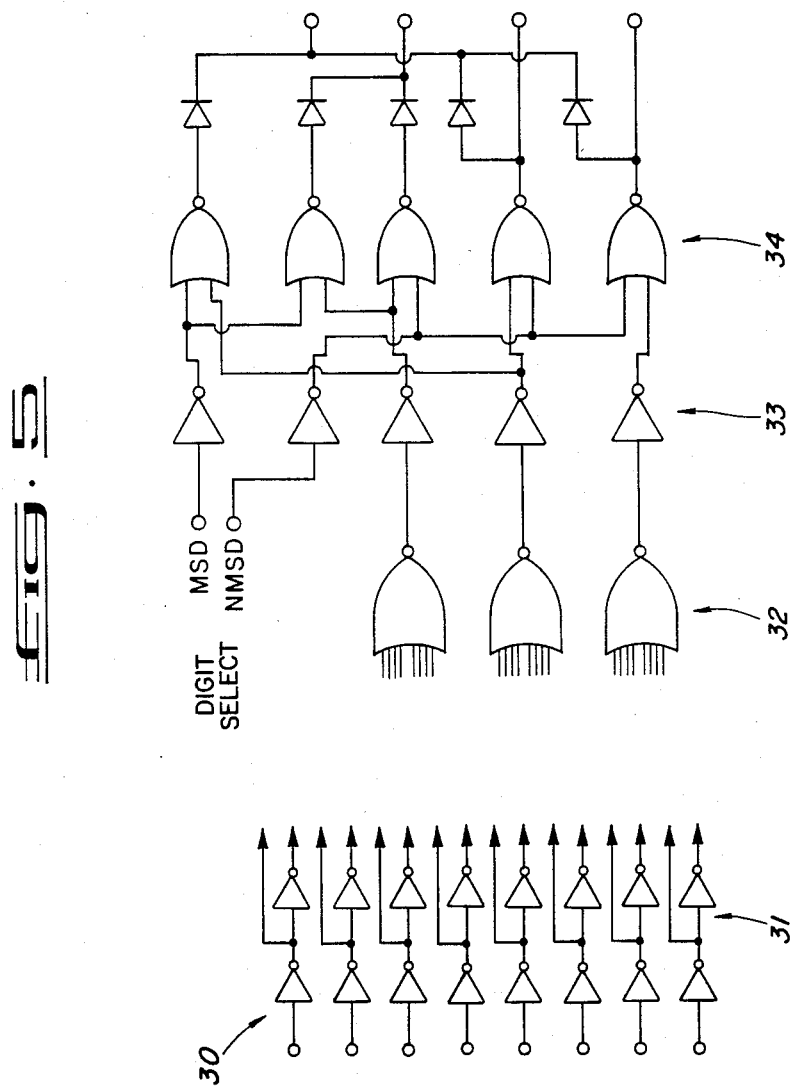
FIG. 5 is a schematic drawing of a decode circuit which can be used in the present invention.

FIG. 5 shows a typical decode circuit which can be used in the apparatus of this invention. The 8-bit digital code is buffered through a series of sixteen Schmitt invertors 31. The recognition code for the heat-fusion pipe fitting electrical heating elements 14 is defined by the arrangement of links to the 8 input NOR gates 32. Three such NOR gates are shown for defining three fusion times such as 90, 150 and 220 seconds. When a valid code is present at any 8 input NOR gate the relevant signals are transferred through inverters 33 and 2-input NOR gates 34 to pins 35 on the counter chip 36 shown in FIG. 6. These pins are typically designated on and ICM 7217 chip.

Figure 6:
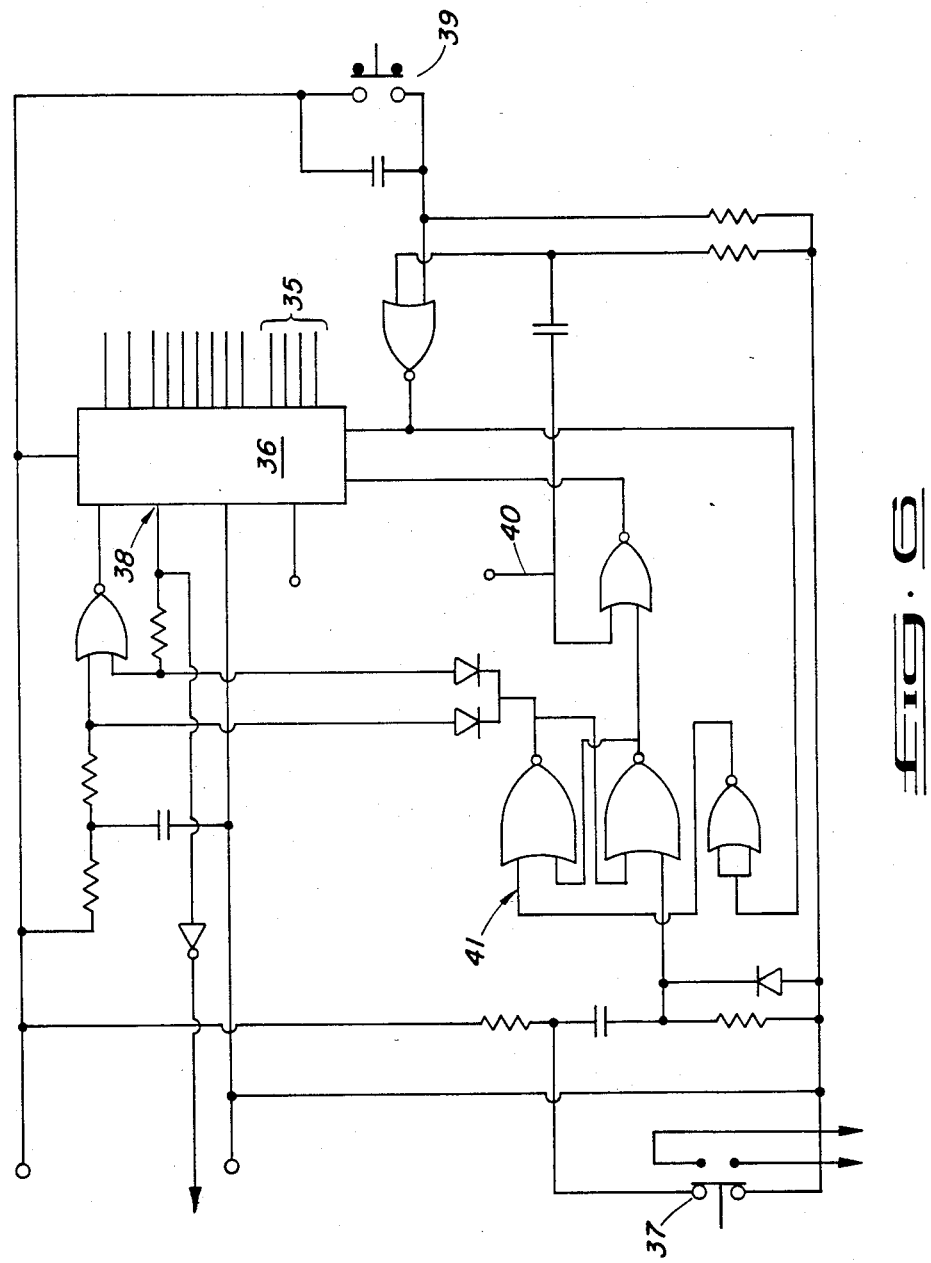
FIG. 6 is a schematic drawing of a control circuit which can be used in the present invention.

FIG. 6 shows the control circuit for the fusion timing control. ICM chip 7217 36, for example, converts the binary coded decimal code to a suitable signal for output to a light emitting diode display (digit segments) and stores the appropriate code in a count register. The fusion cycle, which controls the time for which the heat-fusion pipe fitting electrical heating element is energized, is initiated by depressing the fusion push button 37 to change the R-S latch condition which starts the fusion time countdown. This time countdown is also displayed by the light emitting diodes on a control box. When the count registers zero, a signal from the ICM chip 36 at location 38 (typically identified as pin 2 on an ICM 7217 chip) causes the termination of the fusion cycle in the counteractor circuit and resets the R-S latch.

The circuit also includes reset push switch 39; fault signal 40 and R-S latch 41.

The advantages of the pipe fitting and control system of this invention include (1) no metal-to-metal contact resistance to overcome in signal detection; (2) continuous self-checking when the power unit is not connected to a pipe fitting; (3) sensing element in the control circuit can be hermetically sealed; (4) simplified pipe fitting manufacturing process; (5) a minimum of "add-to" cost and complexity to the pipe fitting since all of the electrical control means are in the control unit separate from the pipe fitting; (6) slot combination potentials which permit coding for hundreds of power application intervals; and (7) the adaptability of the system for use in controlling the fusion impressed voltage and fusion current as well as the fusion time.

It will, of course, be understood that the present invention has been described above only by way of example, and modifications of detail can be made within the scope and spirit of the invention by the skilled artisan.

I claim:

1. A thermoplastic heat-fusion pipe fitting system comprising a thermoplastic heat-fusion pipe fitting having a body portion to accommodate pipe and a shaped portion bearing a code indicative of the amount of heat required to effect the fusion of the fitting, means for heating said fitting associated with the fitting, means for sensing and decoding the code, and control means responsive to information decoded from the code for regulating the amount of heat applied by the heating means to the fitting.

2. A system of claim 1 wherein the code is a digital code.

3. A system according to claim 1 wherein the heating means comprises an electrical heating element integral with the fitting.

4. A system of claim 1 wherein the heating means comprises an induction coil and a metal core integral with the fitting.

5. A system of claim 1 wherein the heating means comprises at least one heating member for application to a surface of the fitting.

6. A system of claim 1 wherein the control means regulates the time for which the heating means is activated.

7. A system of claim 1 wherein the heating means is electrically operated and wherein the control means regulates the electrical power supplied to the heating means.

8. A system of claim 1 wherein the shaped portion is molded integrally with the body portion.

9. A system of claim 1 wherein the shaped portion is releasably connectable to the sensing and decoding means.

10. A system of claim 1 wherein the shaped portion comprises a tab projecting from the fitting in which an array of apertures is formed.

11. A system of claim 10 wherein the sensing means comprises at least one signal means for transmitting signals through the apertures and signal detecting means located to detect signals passing through the apertures.

12. A system of claim 11 wherein the signal means comprises at least one source of electromagnetic radiation.

13. A system of claim 12 wherein the electromagnetic radiation is in the infrared or white light region of the electromagnetic spectrum.

14. A system according to claim 8 wherein the sensing means is located in a head which is releasably connectable to the tab.

15. A system of claim 12 or 13 wherein the source of electromagnetic radiation is remote from a head releasably connectable to the shaped portion and is operatively connected to the head by optical fibers.

16. A method of electro welding thermoplastic pipe which comprises
    (a) providing a thermoplastic heat-fusion pipe fitting bearing a portion to accommodate pipe and a shaped portion bearing a code indicative of the amount of heat required to effect fusion of the fitting;
    (b) bringing the pipe and the pipe fitting into proximity with each other;
    (c) sensing and decoding the code; and
    (d) applying heat to the fitting in accordance with information decoded from the code.

17. A method of claim 16 wherein the heating is effected by an electrical heating element integral with the fitting.

18. A method of claim 16 wherein the heating is effected inductively.

19. A method of claim 16 wherein the heating is effected by contacting a surface of the fitting with at least one heating member.

20. A method of claim 16 wherein the sensing is effected by detecting signals which have been passed through apertures formed in a tab projecting from the fitting.

21. In a thermoplastic heat-fusion pipe fitting and control system, the pipe fitting having a body portion adapted to accommodate pipe at both ends and having an electrical heating element embedded therein and heating element terminals exposed to the exterior of the body portion and having an electrical control system to supply power to the terminals, the improvement comprising:
    a coding tab mounted on the body portion, the coding tab having passages for light formed therein and arranged in a pattern indicative of the fusion time required for the heating element,
    means for passing light signals through the passages in the coding tab to form electrical signals indicative of the pattern of the passages, and
    a control circuit, operatively connected with the means for passing light signals, for converting the electrical signals to control signals which regulate the quantity of power applied to the terminals as a function of the electrical signals.

22. An apparatus of claim 21 wherein the passages formed in the coding tab are slots.

23. An apparatus of claim 21 wherein the control signal additionally regulates the magnitude of the voltage applied to the terminals.

24. An apparatus of claim 21 wherein the control signal additionally regulates the magnitude of the current applied to the terminals.

25. An apparatus of claim 21 wherein the means for passing light signals through the passages comprises at least one light emitting diode.

26. An apparatus of claim 25 wherein the at least one light emitting diode is in an optical head designed to fit over the coding tab.

27. An apparatus of claim 25 wherein the light generated is remote from the optical head, and is operatively connected to the optical head by means of optical fiber.

28. An apparatus of claim 21 wherein the control signal regulates the duration of the power applied to the terminals.

* * * * *